Jan. 12, 1960
R. NICCOLAI
2,920,329
HYDROSTATIC VALVE DEVICE
Filed April 23, 1958
3 Sheets-Sheet 1
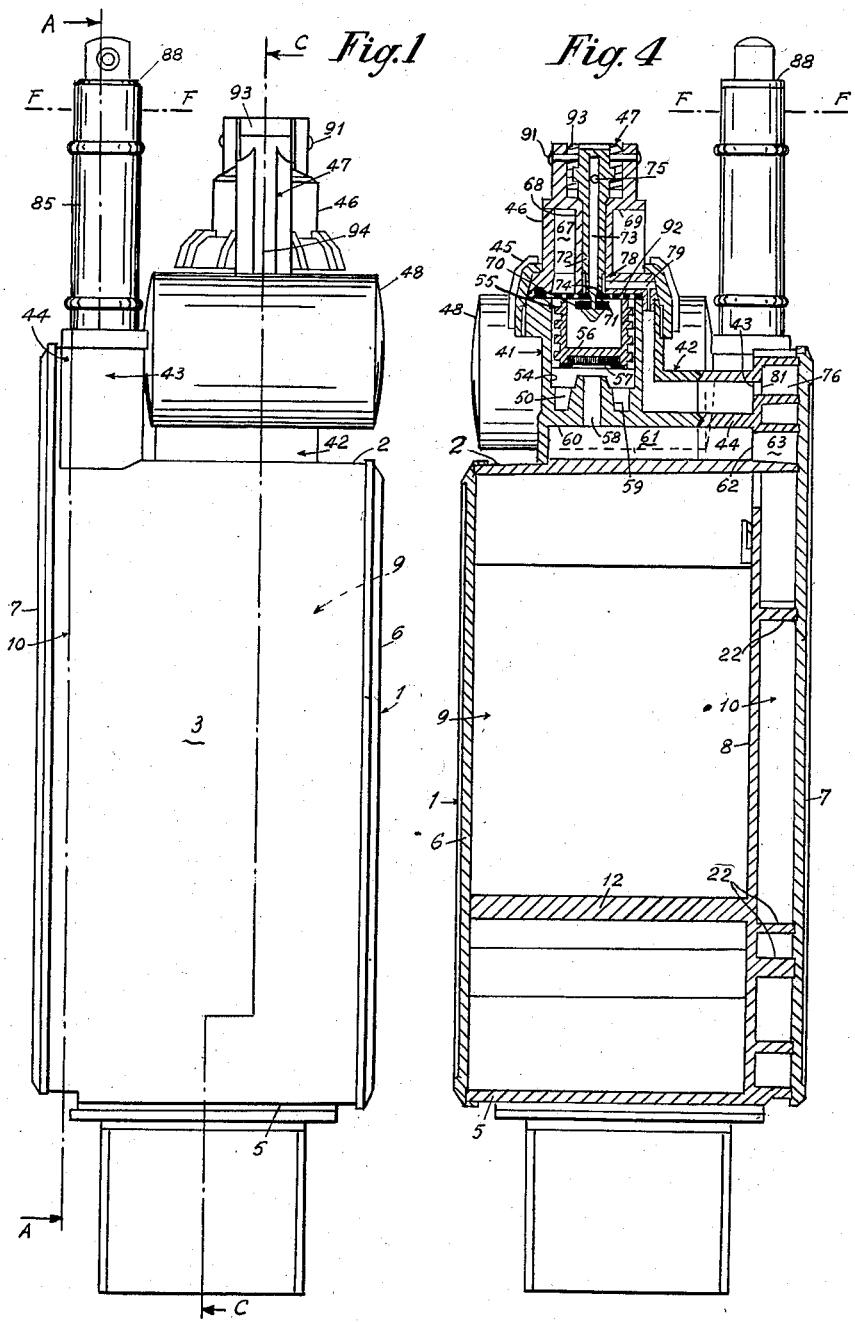
INVENTOR.
RUGGERO NICCOLAI
BY Walter S. Blenton
ATTORNEY

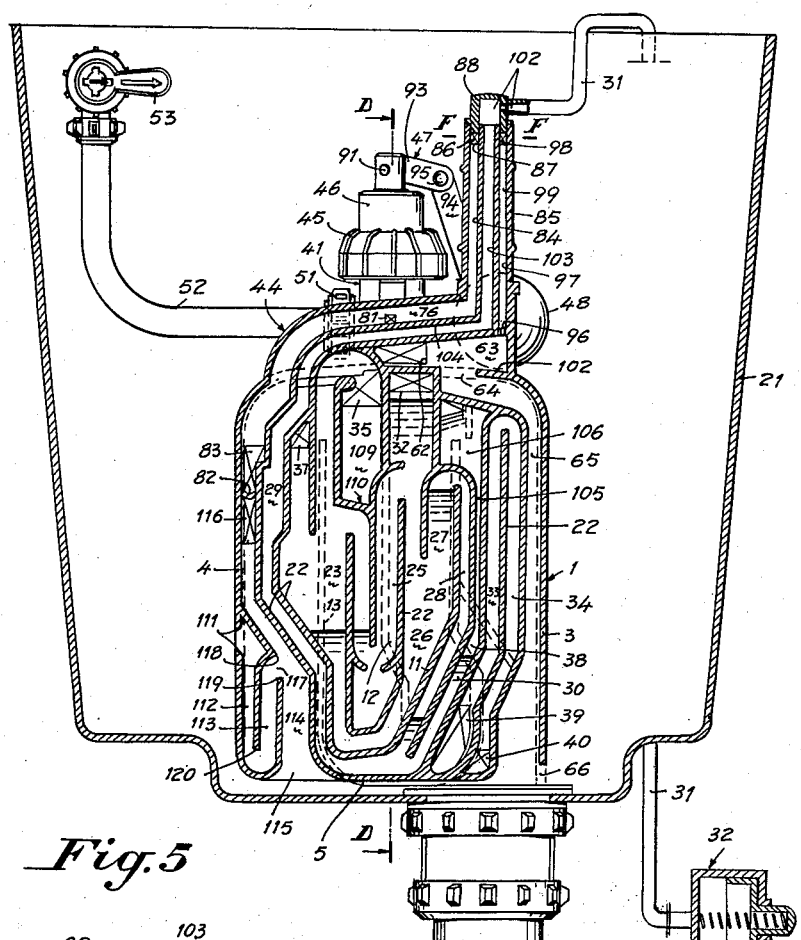

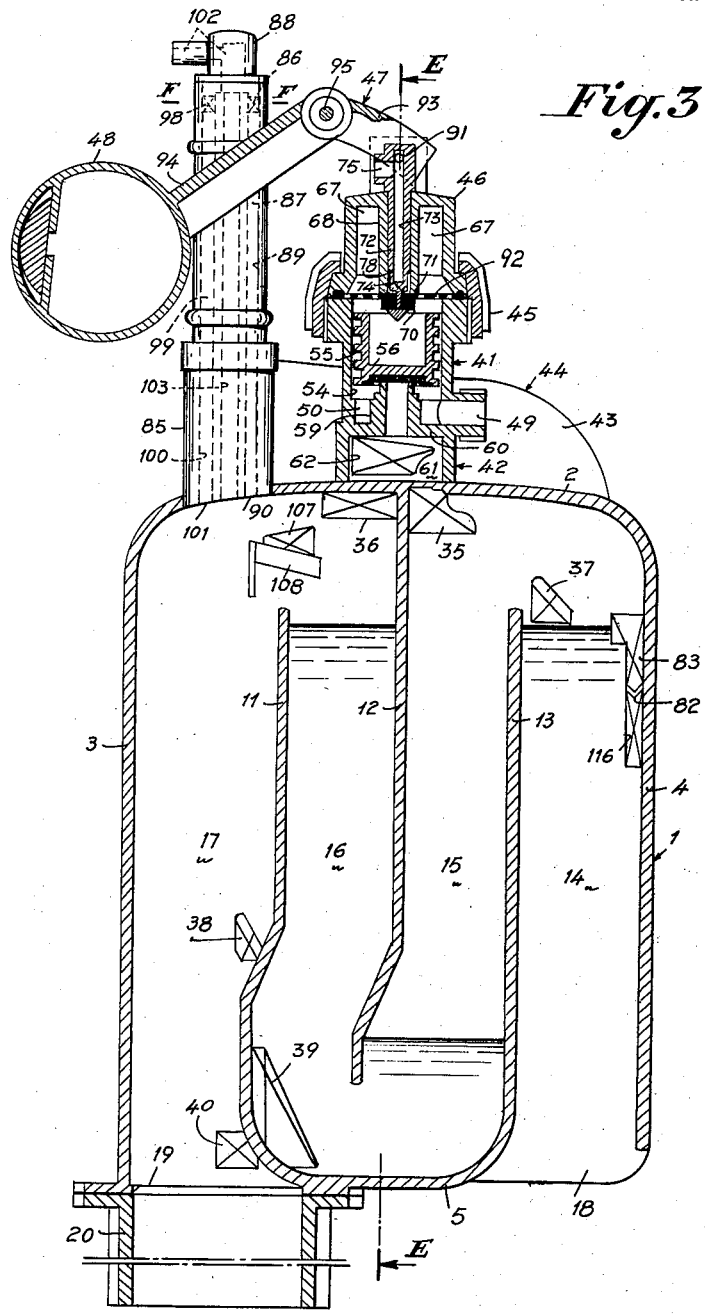

United States Patent Office 2,920,329
Patented Jan. 12, 1960

2,920,329

HYDROSTATIC VALVE DEVICE

Ruggero Niccolai, Rome, Italy

Application April 23, 1958, Serial No. 730,430

Claims priority, application Italy April 27, 1957

6 Claims. (Cl. 4—43)

My present invention relates to improvements in the hydrostatic valve devices of the kind used in water cisterns, for controlling the discharge of water therefrom.

I have described and claimed in my prior U.S. patent specifications Nos. 2,029,939 and 2,606,326 devices comprising a hydrostatic valve and designed for controlling the discharge of liquids from cisterns and more particularly the discharge of water from cisterns communicating with water-closets.

According to the aforementioned prior patents, the hydrostatic valve devices substantially comprised a tank having an inlet communicating with the cistern and an outlet connected with a downward discharge pipe, the inlet and outlet being connected to one another by means of a double siphon duct in a chamber of the tank. In order to discharge the water from the cistern, the double siphon was primed by destroying the hydrostatic equilibrium at the interior of a hydrostatic valve arranged in a second chamber of the tank and separated from the double siphon duct by a partition provided with apertures causing such hydrostatic valve and such double siphon duct to intercommunicate at desired moments and points.

The hydrostatic equilibrium within the hydrostatic valve, was destroyed by raising or lowering the air pressure therein for which purpose a push-button had to be operated. Owing to this destruction of the hydrostatic equilibrium, the effective head of the liquid in the hydrostatic valve was reduced, thus allowing the air to escape entirely from the double siphon through at least one of the openings in the partition, as a result of which the aforesaid siphon became primed, and the liquid contained in the cistern, was completely discharged.

On completion of such discharge, the double siphon was unprimed by admitting air thereto through the apertures provided for the inlet and outlet of the water, said air being capable of establishing at once an atmospheric equilibrium within the double siphon and of leaving a water residue, the atmospheric equilibrium and the water residue being capable of restoring the position of the double siphon in which it stops hermetically the water discharge from the cistern through the discharge pipe.

In my prior U.S. patent specification No. 2,606,326 there were already provided means for removing some drawbacks found in the operation of the hydraulic valve devices described in my prior U.S. patent specification No. 2,029,939. However, drawbacks similar to or different from those set forth in said U.S. patent specification No. 2,606,326 may arise by varying the conditions of employment of the aforementioned hydraulic valve device and/or by increasing its operation period.

More particularly, although the adjustment range of the hydrostatic valve device was increased so as to suit it to the eventual alterations of the filling level of the cistern due to beddings of the seals of the usual float valves designed for interrupting automatically the water supply to the cistern, it may still occur that the maximum filling level of the cistern is exceeded or the minimum level is not reached, because of great seasonal or daily changes of the water pressure in the water pipe. Exceeding the maximum filling level of the cistern causes the automatic priming of the double siphon, i.e. the uncontrolled discharge of water from the cistern. Conversely, failing to reach the minimum filling level prevents the operation of the hydrostatic valve device when the push-button is actuated.

The main object of my present invention is to provide an improved hydrostatic valve device combined with a special float valve capable of operating in a satisfactory manner whatever may be the pressure of the water supplied to the cistern, so that the filling of the cistern is interrupted just at a predetermined constant level.

Another drawback was encountered, when a hydrostatic valve device of the kind described in the aforementioned prior U.S. patent specifications Nos. 2,029,939 and 2,606,326, was applied to a cistern connected by a downward pipe to a so-called "siphonic" water-closet i.e. a water-closet wherein the discharge is caused by the action of a siphon duct capable of priming automatically when the water in the water-closet reaches a predetermined level so as to discharge about the whole amount of the water into a trunk line communicating with the sewer. In such an event, it may occur that the discharge of the water from the cistern coincides with the end of the water discharge from the water-closet, so that the bath room or the privy communicates for a long period with the sewer through the siphon of the water-closet which remains about empty. In consequence, foul air from the sewer may enter the room where the water-closet is located.

Another object of my present invention is therefore the provision of an improved hydrostatic valve device, wherein means are provided for diverting a portion of the water supplied to the cistern during the filling thereof, to the discharge pipe of the cistern and then to the water-closet, in order partially to fill the water-closet, thereby providing a hydraulic seal of the siphon by which the water-closet communicates with the trunk line leading to the sewer.

Another defect shown by the hydrostatic valve devices described in said U.S. patent specifications Nos. 2,029,-939 and 2,606,326, is that the double siphon duct may be primed automatically before the water supplied to the cistern through the float valve reaches the predetermined filling level. Such a defect may arise from three main motives, namely:

(a) Inadequate water residue, at the end of water discharge from the cistern, in that part of the device which was called "controlling siphon" in said prior U.S. patent specification No. 2,606,326;

(b) Inadequate water residue, at the end of the water discharge from the cistern, in the inner branches of that part of the device which was called "hydrostatic trap" in said prior patents;

(c) A too quick closure of the inlet of the double siphon chamber of the device, at the end of water discharge from the cistern, due to a very abundant water supply from the float valve.

A further object of my present invention is therefore to provide a hydrostatic valve device having means suitable to cause a predetermined water amount to remain within the controlling siphon and the inner branches of the hydrostatic valve immediately after the unpriming of the double siphon, in consequence of the water discharge from the cistern, as well as means suitable to cause a certain amount of water to enter the double siphon, at the moment of the unpriming, the amount being sufficient to withstand the pressure of the water supplied to the cistern, whatever may be the delivery rate of the water.

An illustrative embodiment of my present invention will be hereinafter described in detail with reference to the accompanying drawings, in which:

Fig. 1 is a side elevation of the improved hydrostatic valve device according to my present invention;

Fig. 2 is a front section through the same hydrostatic valve device, taken substantially on the broken line A—A of Fig. 1, the section showing also a usual cistern, wherein a device according to my present invention is arranged, and a control push-button for the device;

Fig. 3 is a front section of the same hydrostatic valve device, taken substantially on the line C—C of Fig. 1;

Fig. 4 is a cross-sectional view of the same device, taken substantially on the line D—D of Fig. 2 or on the line E—E of Fig. 3; and Fig. 5 is a cross-sectional view taken on the line F—F of Figs. 1–4.

For a better understanding of the improvements achieved by my present invention, I will now describe briefly that part of the device already described and claimed in my prior U.S. patent specification No. 2,606,326.

The discharge device substantially comprises a tank 1, formed by a top 2, two lateral walls 3 and 4, a bottom 5, a front lid 6 and rear lid 7, both forming a perfectly tight closure.

The interior of the tank is divided by a partition 8 into a front compartment 9 and a rear compartment 10. The front compartment 9 contains three baffles 11, 12 and 13 (Fig. 3) extending between the wall 6 and the partition 8, so arranged as to transform this compartment into a double siphon. The four legs or branches of the siphon carry the reference numerals 14, 15, 16 and 17. The leg 14 begins with the inlet 18 in the bottom of tank 1, while leg 17 ends in the outlet 19, also located in the bottom of the tank, and connected to the flush pipe 20 (Figs. 2 and 3).

The rear compartment 10 is divided by a number of other baffles, all indicated by the common reference numeral 22 (Figs. 2 and 4), into spaces, most of which communicate with each other. These baffles are made integral with the partition 8, and their contact surfaces with the opposite wall 7 form a perfect seal, so that no fluid can leak through. By this arrangement, the rear compartment 10 is also converted into a series of mostly intercommunicating ducts, a number of which, such as those carrying the reference numerals 23, 24, 25 and 26 (Fig. 2) form the so-called hydrostatic valve or trap, essentially a double siphon, from which a control siphon formed by the two intercommunicating ducts 27 and 28 branches off.

Duct 28 branches into a duct 29 connected by the air pipe 31 to the push-button 32. The lower end of duct 29 communicates with a duct 30 which is open to the atmosphere through an aperture 38 and the discharge pipe 20. This assembly of ducts constitutes the hydrostatic valve and the control siphon proper.

The compartments 9 and 10 communicate at proper points and moments through openings.

Especially the opening 35 conveniently connects the ducts 23 and 24 of the hydrostatic valve device with the top of the siphon consisting of the legs 14 and 15.

Another opening 36 connects the ducts 25 and 26 of the hydrostatic valve with the top of the siphon formed by the legs 16 and 17. A third opening 37 connects duct 23 of the hydrostatic valve to the leg 14. A fourth opening 38, in the middle of leg 17, leads into the duct 30 of the other chamber 9.

The operation of this device, although mainly corresponding to that of my prior U.S. Patent 2,606,326, will be summarized in the following:

The tank 1 communicates with the cistern through its inlet 18. When water enters cistern 21, its level also rises in the leg 14 of the double siphon, spills over the top of baffle 13 into branch 15 and fills the bottom of the siphon formed by the branches 15 and 16 until it reaches the lower end of baffle 12. From this point on it entraps the air which has remained in 14 and 15, to form an air cushion the pressure of which prevents the water level to rise above a certain limit. Therefore, when the water level in the cistern has reached the level determined by the setting of a float valve, the equilibrium conditions reached in the double siphon will be the following:

Leg 14 contains water to a height not exceeding the top of baffle 13; leg 17 contains no water and is open to the atmosphere through flush pipe 20. Leg 16 contains a higher water column than branch 15 due to the pocket formed by the air entrapped between legs 14 and 15. It is clear that under equilibrium conditions the head formed by the difference in the levels of the water columns in the legs 16 and 15 is equal to the pressure of the entrapped air, and this in turn must equal the static head between the water level in the cistern 21 and the water level in leg 14.

Through the opening 37, the lower edge of which lies somewhat below the top of baffle 13, water from the branch 14 spills into the ducts 23, 24, 25 and 26 of the other compartment. The rising water will produce in these ducts conditions similar to those in the four legs 14, 15, 16 and 17 of the other compartment, whereby the air pocket produced in space 109 will equalize its pressure with that of the corresponding air pocket in leg 15 through the orifice 35.

In this compartment, if we assume that in the ducts 28 and 30 some water was left from a previous discharge of the tank, and that the water level in the cistern has reached its normal predetermined level, the equilibrium conditions are the following:

Owing to the air pressed through openings 37 and 35, the ducts 23 and 24 contain water up to a level situated just slightly above the lower rim of the baffle separating the ducts 24 and 25. In the ducts 25 and 26 the liquid reaches a maximum level corresponding to approximately the lower edge of the opening 36.

In the control siphon formed by the ducts 27, 28 and 30, the air entrapped between the water which has flown over the rim of the baffle separating ducts 27 and 28, and the water left over in ducts 28 and 30 from the previous discharge, will cause the duct 27 to be filled almost to the aforesaid rim and the duct 28 will be almost completely filled with air, while the duct 30 is again filled with liquid almost to the opening 38.

Thus, the static head between the levels in the cistern 21 and in the leg 14 of the double siphon is counterbalanced in the hydrostatic valve compartment by the head formed between the level of the column above ducts 25 and 26 and the level in the ducts 23 and 24, while in the control siphon, heads will be caused by the difference in level between the liquid column above ducts 25 and 26 and the liquid column in duct 27, and the head formed by the difference in level between the liquid columns in duct 30 and duct 28.

If the push button 32 is now actuated, air is pressed through pipe 31, duct 29 and duct 30, and it pushes the water column in the latter in part through the opening 38. This reduces the water column in the duct 30, and thus destroys the existing equilibrium conditions. Consequently, the control siphon is primed, and through the opening 38, its water is discharged into the adjacent branch 17 of the double siphon and from there into the flush pipe 20. This again causes a reduction of the head between the level over 25 and 26 and in ducts 24 and 25, which no longer counterbalance the static head between the water levels in the cistern 21 and in the leg 14. The overall result is the priming of the multiple siphon formed by the ducts 24, 25, 26, 27, 28 and 30, whose ensuing discharge destroys the air pocket existing between the legs 14 and 15, as it becomes open to the atmosphere.

Therefore the head between the levels in 21 and 14 is no longer counterbalanced, the double siphon is primed and discharged through the flush pipe 20. The arrangement is completed by a supplementary siphon formed by the ducts 33 and 34, in which the bottom of duct 33 communicates through the opening 39 with the filled leg 16 and the bottom of duct 34 communicates with the empty leg 17 in the other compartment. This supplementary siphon has the purpose of insuring the complete emptying of the bottom of the siphon formed by the branches 15 and 16 during the discharge, owing to the suction produced in duct 34 by the water discharging through leg 17.

The equilibrium between the various heads is also destroyed when by some reason the water level in cistern 21 rises above its normal level, as the greater head between liquid level in cistern 21 and branch 14 is no longer counterbalanced by the pressure of the air pockets. The control siphon is thus primed by the water rising in 27 and forcing the air pocket formed in 28 and the water column in 30 through the opening 38.

The improvements disclosed in my prior Patent No. 2,606,326, were aimed at giving the discharge device an operating range between the maximum and minimum levels in the cistern 21, within which it would ensure a trouble-free working independently of the variations in maximum levels caused by the imperfection inherent in the conventional float valves. These inaccuracies in part stem from dimensional changes in their gaskets, caused by the setting of the same, but mainly from the daily, monthly or seasonal variations in water pressure in the city mains, which affect the operation of the cut-off devices in conventional float valves.

A third cause of inaccuracy is that the buoyancy of the float varies according to the extent to which it is immersed.

I have found that these drawbacks of conventional float valves can be eliminated by replacing the cut-off devices, which in these conventional float valves operate in a direction opposed to the pressure of the water, by cut-off members actuated by this very pressure which becomes operative when the float is lifted in the cistern 21 to a well determined and constant height by the rising water.

Therefore, the object of my present invention is to combine a hydrostatic valve of the type previously described and patented under No. 2,606,326 with such an improved float valve. A practical embodiment of this float valve and the manner in which it can be combined with the aforementioned discharge device will now be described in detail with reference to the accompanying drawings.

With reference to Figs. 1, 3 and 4, such float valve consists of a body 42 containing various cavities and ducts. One of these ducts 61 is connected with one end to the water pipe 52 the flow through which is controlled by a conventional cut-off valve or by a cock 53, while its other end leads, through an opening 62, into a cavity 63 in the top of the tank 1, and from there, through the duct 65 and its outlet 66, into both the flush pipe 20 and the tank bottom. A bore 58 in the valve seat 59 connects duct 61 with an annular cavity 50 and a slightly larger bore 54 within which a hollow plunger 55 can freely move in a vertical direction. Its bottom is recessed to contain a gasket which rests upon the chamfered top of the valve seat 59, when the plunger assumes its lower position. The vertical part 41 of the valve body 42 is tightly jointed to a hollow bonnet 46 by a ring nut 45. The bonnet 46 ends in a support to which the articulated arms 93 and 94 of the float 48 are hinged by the pivot pin 91.

Through the center of the bonnet 46 passes a vertical tube 68 having a chamfered lower end. A hollow spindle 72 is slidable within the tube 68. The spindle 72 is provided, near its lower end, with a groove engaged by a gasket 70 which can tightly bear against the chamfered lower end of the tube 68. The axial cavity 73 of the spindle 72 remains permanently open to the atmosphere through a small hole 75 in the upper end of the spindle. Another small hole 74 in the opposite end of the spindle 72 connects the semi-circular cavity 67 of the bonnet with the bore 73 in the spindle when the latter is in a given position. A peripheral recess 78 provided in the spindle 72 also connects the semi-circular chamber 67 with a duct 76 in the extension 44 located in the top of the tank, via a bore 79 in the bonnet 46, an angular duct 80 continuing in the extension 4' of the tank, and a calibrated orifice 81 provided in the partition 8 of the tank 1. This duct 81, which extends into the tank 1, ends in a partition 82 (Fig. 2) and directly communicates with the leg 14 of the double siphon through an opening 83 of the partition 8. As shown in Figs. 2 and 3 the opposite portion of duct 76 leads through a cavity 84 of a tubular extension 85 of the tank 1 (Figs. 2 and 3) and through a clearance 86 left between the top of the radial partition 87 (Fig 5) and the bottom of a plug 88 closing the top of the tubular extension, into the adjacent duct 89 and thence through the opening 90 into the top portion of the siphon legs 16 and 17 (Fig. 3).

The operation of the above described float valve is as follows:

First it is to be assumed that the cistern 21 is empty and the control cock 53 is in open position, so that the feeding water flows through the pipe 52 at whatever pressure and enters the float valve through the transverse duct 49. At this point the floating body 48 is urged downwards by its weight so that the arm 47 pivoted at 91 on the bonnet 46 and eccentrically connected to the slidable spindle 72, keeps the spindle 72 in its lowered position, wherein the gasket 70 is spaced from the lower edge of the vertical tube 68, as clearly shown in Fig. 4. When the gasket 70 is in this position, the semicircular chamber 67 communicates with the atmosphere through the little bore 74, the axial cavity 73 of the spindle and the outlet 75.

Accordingly, it will be easily understood that the water entering the annular cavity 50 of the duct 49 pushes the free plunger 55 upwards so that it enters plentifully the cistern 21 through the axial bore 58, the horizontal duct 61, the aperture 62, the cavity 63, the passage 64, the duct 65 and the opening 66. The plunger 55 can freely rise because on the plunger act only the atmospheric pressure existing in the semicircular chamber 67 and the weight of a small amount of water reaching the semicircular chamber 67 through the clearance between the cylindrical chamber 54 of the cylindrical body 41 and the outer circumferential surface of the plunger 55. The water accumulated in the semicircular chamber 67 may be eventually discharged into the cistern 21 through the passages 74, 73, and 75 and also 78 and 79. The upward stroke of the free plunger 55 is limited by a perforated plate 92 allowing the free passage of air and water between the cylindrical chamber 54 and the semicircular chamber 67.

When the water reaches a predetermined level within the cistern 21, the floating valve 48 will have been raised up to a predetermined upper position (e.g. that shown in Fig. 3) causing the slidable spindle 72 to rise. The adjustment of this cistern filling level may be readily accomplished if the rocking arm 47 is divided into two lengths 93 and 94 pivoted to one another at 95 and adapted to be secured in any desired reciprocal relationship. The connection 95 between the lengths 93 and 94 may be formed e.g. by a threaded bolt allowing to change the angle between said lengths when slackened and clamping said lengths in the desired angular position when tightened. The same object may be reached by providing a pivotal joint and locking such a joint by a simple welding, when assembling the discharge device. It may be easily understood that the smaller the angle is, which is formed by the lengths 93 and 94, the lower is the cistern filling level; when such a level is reached, the float rises and the hollow spindle 72 will be lifted up to the position shown in Fig. 3. Such a lifting of the spindle causes the quick and sure stop of the water delivery to the cistern 21, as hereinafter explained.

The lifting of the shank 72 causes the gasket 70 to bear against the lower edge of the fixed sleeve 68 so as to close any communication between the semicircular chamber 67 and the outer atmosphere through the openings 74, 73 and 75. In this way, since the water continues to enter the semicircular chamber 67 through the clearance between the cylindrical chamber 54 and the free plunger 55, a pressure equal and opposed to that acting under said plunger will be quickly set up above the plunger 55. In consequence, the plunger 55, urged only by its weight, moves quickly downwards until its packing 57 plugs hermetically the axial bore 58, thereby stopping suddenly the water delivery to the cistern. The downward movement of the plunger 55 is facilitated also by a strong suction created within the axial bore 58 by the water which in the ducts 61, 63 and 65 tends to enter from the opening 66 owing to its inertia, in spite of the intercepting action of the plunger 55. Hence the pressure of the water delivery to the cistern does not at all affect the operation of the float valve, whatever may be the water pressure tending to raise the free plunger 55 during the filling of the cistern, as an equal back pressure will be always established within the semicircular chamber 67, at the rising of the hollow spindle 72, acting downwards on the plunger 55.

The stop of the water delivery, caused by the downward movement of the free plunger 55, occurs suddenly and this fact might cause serious damages to the float valve and the ducts supplying the water thereto, due to the water-hammer caused by the instantaneous interception. However, in the above described float valve, the water-hammer is deadened or suppressed by an air cushion in the upper part of the semicircular chamber 67. In fact I have already stated that during the cistern filling, i.e. when the hollow spindle 72 is lowered, the water entering the semicircular chamber 67 through the clearance between the cylindrical chamber 54 and the free plunger 55, may discharge into the cistern through the passages 74, 73, 75 and 78, 79 which put the chamber 67 in communication with the atmosphere. This means that the air existing within such chamber 67, gathers when assembling the discharge device, in the upper part of the chamber 67 and is compressed when the rising of the spindle 72, i.e. the downward movement of the free plunger 55, causes the water delivery to stop. Just such a compression of the air within the semicircular chamber 67 deadens the water-hammer.

However, the amount of the air within the chamber 67 might gradually decrease in the long run; then it is necessary to provide means for replenishing periodically the air so as to ensure the existence of the air cushion. The hereinabove indicated ducts and passages 78, 79, 80, 81, 76, 83, 84, 86, 89 and 90 are used also for this purpose.

When starting the water discharge from the cistern 21 through the double siphon 14, 15, 16, 17 and the discharge pipe 20, a suction effect due to the height of the discharge column 20 is established within all the branches of the siphon. Such a suction effect acts on the opening 81 through the opening 83 and the duct 76 as well as through 90, 89, 86, 84 and 76. This suction, occurring during the entire water discharge stage, removes completely the water present within the semicircular chamber 67 of the float valve through 78, 79, 80 and the atmospheric air entering through the outlet 75 of the slidable spindle 72, its axial cavity 73 and the little bore 74 is substituted for the water. In this way, upon any water discharge from the cistern 21 the chamber 67 of the float valve is returned, to the position which it had at the moment of assembling the discharge device.

As I have already stated, it may occur that the discharge of the water from the cistern 21, i.e. the unpriming of the double siphon 14, 15, 16, 17, coincides with the end of the water discharge from a water-closet provided with suction siphon, thus coinciding with the unpriming of the suction siphon. If such a coincidence takes place, the room where the water-closet is located, communicates for a long period with the sewer, so as to foul the air of the room within a short time. In order surely to avoid such an occurrence, it is necessary to provide means ensuring a water delivery to the water-closet after the emptying of the cistern 21 and at least during the whole period during which the cistern is again filled with water. Such delivery of water will be sufficient to close hydraulically the suction siphon but not so great as to cause the priming of the siphon. These auxiliary water delivery means for the water-closet comprise, in the embodiment shown in Figs. 2, 3 and 5, the cavity 63 provided within the upper projection 44 of the tank, a little gauged bore 96, an ascending duct 97 provided within the vertical turret 85, a passage 98 provided within said turret between the upper edge of a radial partition 99 and the hermetic plug 88, and a descending duct 100 within the turret and crossing the upper wall 2 of the tank 1 in communication with the last branch 17 of the double siphon as indicated by the reference number 101. On starting the water discharge from the cistern 21, the water delivery to the cistern will also start, because of the lowering of the float 48, allowing the water coming from the pipe 52 to reach the cavity 63, to flow through the descending duct 65 and leaving through the opening 66 as already described. A portion of the water delivery, reaching the cavity 63 at a predetermined pressure, is slowed down and deflected by a wall 102 protruding into the cavity 63 and forming a sort of recess suitable to deviate a portion of the water through the little gauged bore 96, the ascending duct 97 of the turret 85, the upper passage 98, the descending duct 100, the branch 17 of the double siphon, the discharge pipe 20, until said portion enters the water-closet communicating with the discharge pipe 20. It is apparent that, during the cistern discharge stage, such a portion of the water delivery deviated at the cavity 63, joins again with the main water current which is discharged from the cistern through the double siphon 14, 15, 16, 17 and the discharge pipe 20. The main water current stops when the water level within the cistern is so lowered that air enters through the inlet 18 of the double siphon (water discharge from the cistern 21), as already described in my prior Patent No. 2,606,326. Contrary thereto, the minor water portion deviated through the passages and ducts 96, 97, 98, 99, 17 and 20, continues to enter the water-closet also during the entire cistern filling stage, that is to say for all the period during which the aforementioned float valve allows the water delivery to the cistern. The little opening 96 has such sizes that the amount of water discharged into the water-closet by the minor portion during the cistern filling stage, is sufficient to close hydraulically the suction siphon of the water-closet, without causing the priming thereof.

In my prior Patent No. 2,606,326 there was described in detail a controlling siphon designed for priming the hydrostatic valve of the discharge device, when the device was primed or actuated by creating therein an air pressure or depression caused by a hand actuated push-button. A controlling siphon 27, 28, 30 similar to that described in my aforementioned prior patent, is provided also in my present invention and its priming or actuation is accomplished by creating an air pressure or depression within the duct 29 communicating with the lower portion of the controlling siphon. The air pressure or depression is obtained by actuating the push-button 32 and is transmitted to the duct 29 through the pipe 31, an angulated duct 102 provided within the plug 88 closing hermetically the top of the turret 85, a duct 103 extending axially within the turret (see also Fig. 5) and a sloping duct 104 provided within the upper projection 44 of the tank 1.

I have found that a controlling siphon unit of the aforementioned kind and similar to that described in my prior Patent No. 2,606,326, may have some defects. In fact, when the water discharged from the cistern 21, descends very quickly through the discharge pipe 20 and the last branch 17 of the double siphon, a strong suction is established within the branch 17 and transmitted to the water present in the controlling siphon 27, 28, 30 through the aperture 38 provided in the intermediate wall 8 of the tank. Owing to this fact, it may occur that, at the end of the water discharge from the cistern 21, the water still remaining in the duct 30 and in the lower portion of the ducts 28 and 29 is not sufficient to withstand the air pressure which is being created within the duct 27 and the upper part of the duct 28 during the new filling of the cistern. In consequence, the controlling siphon becomes automatically primed when the water reaches a predetermined level within the cistern 21 so as to cause the uncontrolled discharge of water from the cistern. In order to remove this defect, I have provided means suitable to ensure that there is always within the controlling siphon 27, 28, 29 and 30, at the end of the discharge stage, a water amount sufficient to prevent the automatic priming of said controlling siphon during the successive cistern filling stage. According to the embodiment shown in Figs. 2 and 3, said means comprise a duct 105 having a reduced cross-sectional area, extending vertically and communicating with the upper end of the duct 30 of the controlling siphon, a water assembly chamber 106 communicating with the upper end of said duct 105, and an aperture 107 made in the partition 8 of the tank 1 and suitable to put into communication said water assembly chamber 106 with the upper portion of the branches 16 and 17 of the double siphon. Furthermore, on the side of the partition 8 facing the double siphon, a baffle or projecting wing 108 is provided in the vicinity of said aperture 107 so as to deviate into the latter a portion of the water flowing through the double siphon 14–17 during the cistern discharge stage. The water deviated through the aperture 107, accumulates in the assembly chamber 106 and only a small portion thereof is allowed to flow down through the duct 105 having a very small cross-sectional area, which is calculated so as to allow a very limited water passage from the chamber 106, taking also into consideration the fact that, if the suction transmitted through the aperture 38 to the water contained within the controlling siphon (causing the aforementioned defect) would be transmitted also to the water contained in the assembly chamber 106, the desired result would not be achieved. Contrary thereto, by designing a proper cross-sectional area for the duct 105, it may be obtained that, at the end of the water discharge from the cistern, there is still a water amount in the assembly chamber 106, suitable to enter the controlling siphon 28, 29, 30 during the successive cistern filling stage and sufficient to establish in the controlling siphon such a water column as to prevent the automatic priming of the controlling siphon, and the uncontrolled discharge of water from the cistern 21.

In my prior U.S. patent specification No. 2,606,326 some provisions (the aperture 37 in the partition 8 of the tank 1) were already designed for ensuring, in the lower portion of the ducts 23 and 26 of the valve 23, 24, 25, 26 and during the filling stage, a water amount sufficient to prevent the automatic priming of the controlling valve during the successive cistern filling stage, thus preventing the uncontrolled discharge of the cistern. I have noticed that a similar defect occurs in the event that also in the ducts 24 and 25 of the controlling siphon an insufficient water amount remains, in consequence of obstructions or counterslopes happening along the discharge pipe 20. In order to avoid this defect, my present invention provides means suitable to remove the desired water amount in the ducts 24 and 25 of the hydrostatic valve, during both the discharge of water from the cistern 21 and the successive filling thereof.

In the embodiment illustrated in Figs. 2 and 3, the feeding means comprise a water assembly chamber 109, the aperture 35 (having reduced sizes in respect of the corresponding aperture 5 described in my prior Patent No. 2,606,326) and a gauged bore 110 connecting the assembly chamber with the upper end of the duct 24 of the hydrostatic valve. During the discharge of the water from the cistern 21 through the double siphon 14 to 17, a portion of this water crosses the aperture 35 and gathers within the chamber 109 so as to fill up said chamber 109. Only a little portion of such water accumulated within the assembly chamber 109, is allowed to descend in the duct 24 of the hydrostatic valve during the relatively quick discharge stage, as the bore 110 has been gauged for this purpose. Contrary thereto, during the successive relatively slow cistern filling stage, most of the water accumulated within the chamber 109 descends gradually in the ducts 24, 25 of the hydrostatic valve through the gauged bore 110, so as to ensure the presence in said ducts of the desired water amount before the water reaches in the cistern its filling level controlled by the hereinbefore described float valve. The sizes of the bore 110 (as already stated for the duct 105 of reduced cross-sectional area) are designed in consideration also of the fact that, during the discharge of water from the cistern 21, the water contained in the assembly chamber 109, is subjected through that bore to the same suction action to which the water residue in the ducts 24, 25 of the hydrostatic valve is subjected, this suction causing the defect which is to be eliminated.

A last defect found in the discharge device described in my prior Patent No. 2,606,326, occurs when, as already stated, a very abundant water supply is provided for effecting the cistern filling. In said prior patent I have shown that the discharge of water from the cistern, through the double siphon 14 to 17 and the discharge pipe 20, occurs just when the water level in the cistern goes down below the inlet 18 of the double siphon so as to cause atmospheric air to enter the siphon. For restoring the necessary equilibrium between water columns and air pressure within the double siphon and for avoiding that the double siphon becomes primed or is automatically actuated during the successive cistern filling, it is necessary to see to it that the air amount filtering through the inlet 18 at the end of the discharge stage, is not less than a predetermined minimum. This indispensable condition may not occur in the aforementioned cases of abundant water delivery to the cistern, because the time is greatly reduced during which the inlet 18 of the double siphon is above the water level, i.e. the time between the end of the discharge stage and the start of the filling stage of the cistern. In order to avoid this defect, my present invention provides means allowing the atmospheric air to enter the double siphon 14 to 17 during a rather long interval, i.e. between the moment at which the water descending in the cistern during the discharge stage reaches the minimum level defined by the inlet 18, and the moment at which the water rising in the cistern during the successive filling stage reaches another level above the minimum level.

According to the embodiment shown in Figs. 1, 2 and 3, these auxiliary air feeding means for the double siphon substantially comprise an aperture 111 provided in the side wall 4 of the tank 1 at a certain distance from the bottom 5 and in correspondence with the hydrostatic valve chamber 10 of the tank 1, an automatic siphon valve 112, 113, communicating with the interior of the cistern 21 through the aperture 111, and an ascending duct 114 communicating at its lower end with the interior of the cistern 21 through a passage 115 provided in the bottom 5 of the tank, the duct 114 communicating at its upper end with the first branch 14 of the double siphon through an aperture 116 provided in the partition 8 of the tank, and also communicating at an intermediate point with the siphon valve 112, 113 through a suitable passage 117.

When the cistern 21 is filled with water, also the ducts 112, 113 of the siphon valve and the ascending duct 114 are filled with water. From the moment on when the water discharge from the cistern through the double siphon 14–17 and the discharge pipe 20 starts, there is established within the branch 14 of the double siphon a suction acting through the aperture 116 on the water present in the ducts 112, 113, 114. In consequence of this, during the discharge stage the water existing in the cistern 21 enters through the passage 115, flows upwards into the duct 114 and reaches the main discharge current at the branch 14 of the double siphon through the aperture 116. For the same reason a water current is established also in the siphon valve 112, 113, so that the water entering through the aperture 111 flows into the siphon valve, joins with the ascending current of the duct 114 and reaches together with this current the branch 14 of the double siphon through the aperture 116. When the water level descending in the cistern 21 is below the aperture 111, the water in the duct 112 descends at the same rate as the cistern water because, as the upper portion of the branch 114 (and more particularly the portion comprised between the aperture 116 and the corner 118) is of reduced cross-sectional area in relation to the sum of the ducts 114, 113 communicating therewith, the amount of water sucked through the passage 115 will be only partially caused to return by the suction exerted through the aperture 116 and will cooperate in maintaining in 112 the same water level of the cistern 21 during the discharge stage, up to the end 120 of the plate dividing the branches 112, 113 and located approximately on the same level as the inlet 18.

When the air is sucked by the inlet 18 of the double siphon, the air is simultaneously sucked also through the duct 113 below the end 120, so that the water contained in 113 will be delivered to 114 where also the water arrives which is contained in the upper part 114 below the aperture 116, because of the corner 118 preventing the water to return into 113. From this moment on and up to the instant when the water supplied to the cistern 21 reaches the edge 119 of the siphon valve 112, 113 and drops into the latter, the siphon valve 112, 113 allows therefore the atmospheric air to enter through the aperture 111 and to reach the double siphon 14, 15, 16, 17 through the aperture 116, the other opening 83, the duct 76, the duct 84 of the turret 85, the passage 86, the duct 89 and its end 90. Thereby, as the legs 15 and 16 of the double siphon are both connected to the atmosphere, the residue of water contained therein will be levelled.

It will be apparent that many modifications and alterations of the structure illustrated and described can be made without departure from the spirit and essence of my invention which for that reason shall not be limited but by the scope of the appended claims.

I claim:

1. A hydrostatic valve device for controlling the feeding of liquids to cisterns and the discharge of said liquids therefrom, said device being of the type substantially comprising: a tank internally divided into two chambers separated by a partition provided with apertures, the first of said chambers enclosing a double siphon duct, the inlet of which communicates with the cistern while the outlet communicates with a discharge pipe, the second of said chambers enclosing a hydrostatic valve designed for controlling the destruction of the hydrostatic equilibrium in said double siphon duct; a controlling siphon designed for priming said hydrostatic valve when an air pressure or depression is created therein by hand actuating a pushbutton; and an auxiliary siphon designed for removing the liquid remaining at the bottom of said double siphon duct at the end of the cistern discharge stage; said device being characterized by the fact that a float valve suitable to control the liquid delivery to said cistern is fixed to the upper part of the tank, said float valve substantially comprising: a body having an inner cavity; a plunger freely and vertically reciprocated within said inner cavity between predeterminated limits, said plunger having a perimetric clearance between its outer peripheral surface and the inner surface of said hollow body and being suitable to divide the inner cavity of said body into an upper chamber and a lower chamber; a water feeding duct leading into said lower chamber; an axial bore made in said lower chamber and suitable to communicate therewith when said free plunger is subjected only to the raising action of the water supplied through said feeding duct; a duct feeding water to the cistern, provided in the second chamber of the tank and communicating at its upper end with said axial bore through an aperture provided in said intermediate wall of the tank, while the lower end of said feeding duct leads out from said second chamber through an opening located near the bottom of the tank; an axial sleeve protruding vertically within the upper chamber of said hollow body and opened at the ends; a hollow spindle suitable to be reciprocated in said sleeve and having at its lower end a washer suitable to adhere hermetically on the lower end of said sleeve when said hollow shank is in its raised position; a flow duct in said hollow shank suitable to connect the upper chamber of the hollow body of the valve with the atmosphere; an adjustable angulated lever bearing at one end a floating body and pivoted at the other end to said hollow spindle; these members being so arranged that, when the floating body is subjected to the lowering action of its weight, the upper chamber of the hollow body of the valve communicates with the atmosphere so that the water entering the lower chamber may raise the free plunger and reach the cistern through said feeding duct, whilst, when the floating body is subjected to the upward push of the liquid contained in said cistern, said communication of the upper chamber with the atmosphere is interrupted, so that within said upper chamber there is created at once a back pressure equal and contrary to the pressure of the water entering the lower chamber of the hollow body, so as to allow the free plunger to descend suddenly by its weight and to plug hermetically said axial bore, thus interrupting the water delivery to the cistern.

2. A hydrostatic valve device according to claim 1, characterized by the fact that said float valve is provided with means suitable to deaden the water-hammer, said means substantially comprising: a suction duct, an end of which communicates with the upper chamber of said hollow body of the float valve; a connecting duct, an end of which communicates with the other end of the suction duct; an eddy duct, an intermediate point of which communicates with the other end of said connecting duct through an opening provided in the intermediate wall of the tank, while one of its end communicates with the first branch of said double siphon duct through an opening also provided in said intermediate wall; an ascending duct provided in a turret fixed at the upper wall of the tank, the lower end of this ascending duct communicating with the other end of said eddy duct; a decending duct also provided in said turret and having the upper end connected to the upper end of said ascending duct, while the lower end communicates with the last branch of said double siphon duct through a bore provided in the upper wall of said tank; said means for deadening the water-hammer being suitable to remove the water contained in the upper chamber of the hollow body of the float valve, so that atmospheric air entering said upper chamber through the flow duct of the slidable hollow shank of said float valve is substituted for said removed water.

3. A hydrostatic valve device according to claim 1, characterized by the provision of means for ensuring the hydraulic seal of a suction siphon water-closet, for preventing that the room where said water-closet is located, communicates with the sewer, said means for the hydraulic seal substantially comprising: deviating members arranged in said tank and designed for deviating a portion of the water supplied to the cistern; an ascending duct provided in a turret fixed at the upper wall of said tank, the lower end of said ascending duct being connected to said deviating members by a little gauged bore and a descending duct also provided in said turret and having the upper end communicating with the upper end of the ascending duct, while the lower end communicates with the last branch of the double siphon duct through a bore provided in the upper wall of said tank; said means for ensuring the hydraulic seal being suitable to cause a portion of the water supplied to the cistern to be deviated into said water-closet, during both the discharge stage and the successive filling stage of the cistern.

4. A hydrostatic valve device according to claim 1, characterized by the provision of means for ensuring that, before the cistern filling stage is over, in said controlling siphon is assembled a water amount sufficient to prevent the automatic priming of said controlling siphon, then an uncontrolled discharge of liquid from said cistern, said means substantially comprising: a vertical duct of reduced cross-sectional area, the lower end of which communicates with the upper end of the last duct of said controlling siphon and with the aperture by which said last duct is connected to the last leg of the double siphon duct; and a water assembly chamber, the lower part of which communicates with the upper end of said vertical duct, while its upper part communicates with the upper portion of the last two legs of said double siphon duct through an aperture provided in the intermediate wall of the tank; said means being suitable to cause an accumulation of water within said assembly chamber during the discharge stage, and a transfer of said accumulated water from said assembly chamber to said controlling siphon during the cistern filling stage.

5. A hydrostatic valve device according to claim 1, characterized by the provision of means for ensuring that, before the cistern filling stage is over, in the inner ducts of said hydrostatic valve is assembled a water amount sufficient to prevent the automatic priming of said hydrostatic valve, then an uncontrolled discharge of liquid from said cistern, said means substantially comprising an assembly chamber, the lower portion of which communicates with the upper end of one of said inner ducts of the hydrostatic valve, while the upper portion of said assembly chamber communicates with the second leg of said double siphon through an aperture already provided in the intermediate wall of the tank; said means being suitable to cause an accumulation of a portion of the water flowing within said double siphon duct, within said assembly chamber during the discharge stage, and a transfer of the accumulated water from said assembly chamber to said inner ducts of the hydrostatic valve during the successive cistern filling stage.

6. A hydrostatic valve device according to claim 1, characterized by the provision of means for ensuring an auxiliary air supply to said double siphon duct, said means substantially comprising: a siphon valve, an end of which communicates with the interior of the cistern through an aperture provided in a side wall of the tank and somewhat spaced from the bottom; and an ascending duct, an intermediate point of which is connected to the other end of said siphon valve by a partially obstructed connecting passage, while the upper end of said ascending duct communicates with the first leg of the double siphon duct through an aperture made in the intermediate wall of the tank, and the lower end of said ascending duct communicates with the interior of the cistern through an entrance passage on the bottom of said tank; said means being suitable to cause said siphon valve to be closed hermetically during the water discharge, to open automatically when the double siphon duct becomes unprimed because of the water discharge from said cistern so as to allow an auxiliary air supply to said double siphon duct, and to close hydraulically and automatically during the successive cistern filling, when the liquid supplied to said cistern reaches a predetermined level.

References Cited in the file of this patent

UNITED STATES PATENTS

| | | |
|---|---|---|
| 1,084,267 | Gleeson | Jan. 13, 1914 |
| 1,109,169 | Le May | Sept. 1, 1914 |
| 2,320,132 | Hoffman | May 25, 1943 |
| 2,606,326 | Niccolai | Aug. 12, 1952 |
| 2,640,995 | Wilt | June 9, 1953 |
| 2,700,163 | Sturman | Jan. 25, 1955 |